United States Patent [19]

Aigner

[11] Patent Number: 4,768,571
[45] Date of Patent: Sep. 6, 1988

[54] SAFETY STOP FOR WOODWORKING MACHINES

[76] Inventor: Georg Aigner, Thannenmais, Reisbach D-8386, Fed. Rep. of Germany

[21] Appl. No.: 925,807

[22] PCT Filed: Feb. 14, 1986

[86] PCT No.: PCT/EP86/00071
§ 371 Date: Dec. 3, 1986
§ 102(e) Date: Dec. 3, 1986

[87] PCT Pub. No.: WO86/04849
PCT Pub. Date: Aug. 28, 1986

[30] Foreign Application Priority Data

Feb. 18, 1985 [DE] Fed. Rep. of Germany ....... 3505604
Mar. 14, 1985 [DE] Fed. Rep. of Germany ....... 3509227

[51] Int. Cl.⁴ .................... B27B 31/00; B27C 1/12
[52] U.S. Cl. ..................... 144/253 J; 144/134 A; 144/253 R
[58] Field of Search ............... 269/297, 317; 144/134 R, 134 A, 253 R, 253 J; 409/226

[56] References Cited

U.S. PATENT DOCUMENTS 2,896,676 7/1959 Shouten .................. 144/253 J
4,304,276 12/1981 Termini .................. 144/253 J

FOREIGN PATENT DOCUMENTS 241972 4/1946 Switzerland .
291579 9/1953 Switzerland .
380356 9/1954 Switzerland .

Primary Examiner—W. Donald Bray
Attorney, Agent, or Firm—Cohen, Pontani & Lieberman

[57] ABSTRACT

A safety stop for woodworking machines, particularly milling machines, having a first stop plate and a second stop plate (10, 12) which are arranged in a common plane on both sides of the tool (14) and leave between them a slot (16) for the passage of the tool (14), and having stop bars (32) which extend parallel to each other and span the slot (16); in order to provide a work unit which is formed of parts which cannot be lost and which is adapted to be placed in readiness for operation without tools, the stop bars (32) are so integrated in the first stop plate (10) that they can be introduced from grooves (30) incorporated in said stop plate into grooves (30) in the second stop plate (12).

23 Claims, 4 Drawing Sheets

SAFETY STOP FOR WOODWORKING MACHINES

BACKGROUND OF THE INVENTION

1. Field of the Invention

The present invention relates to a safety stop for woodworking machines, particularly milling machines, having a first stop plate and a second stop plate, which stop plates are arranged in a common plane on both sides of the tool and leave free between them a slot for the passage of the tool, and having stop bars which extend parallel to each other and span over the slot, said bars engaging in grooves in the stop plates.

2. Statement of Related Art

In the safety stops heretofore used in actual operation, stop bars are kept on hand for the two stop plates, it being necessary to fasten them one above the other on the two stop plates at a greater or lesser distance apart depending on the size of the milling tool which is used. For this purpose an Allen wrench is generally used in order to be able to fasten the screws seated on the bars in engagement slots in the stop plates.

This has been found to have the disadvantage that it is necessary to keep on hand a plurality of stop plates, which are generally of different height, so that the worker is forced to remove them from their place of storage when they are needed. This practice is not only time-consuming and cumbersome but also leads to the stop bars not being used at all in order not to have to mount them. In addition, a tool is necessary for the fastening of the stop bars. Furthermore, the loose individual parts ar easily lost.

From Federal Republic of Germany Provisional Patent No. AS 1 031 954 a safety stop of the above-mentioned type is known which has a plurality of loose stop bars which must be inserted as needed into the grooves of the stop plates. For this purpose it is necessary to move the two stop plates away from each other in order to be able to insert the bars into the grooves. When the two stop plates are thereafter brought together the inclined ends of the stop bars are enclosed between beveled ends of cover parts which partially cover the grooves.

As a result, this safety stop has the same disadvantages, which reside in the fact that the bars are available only in loose form and may be lost or must frequently be sought in time-consuming fashion. Furthermore, the width of the slot between the two stop plates for the passage of the tool cannot be varied since the width of the slot is dependent on the length of the stop bars.

DESCRIPTION OF THE INVENTION

The object of the invention is to develop a safety stop of the above-indicated type in such a way as to have available a work unit which is formed of parts which cannot be lost and which can be rapidly brought into the position of use desired in each case.

In accordance with the invention this object is attained by mounting the stop bars in non-releasable fashion in the first stop plate. The stop bars can then be introduced from the grooves in the first stop plate into grooves provided in the second stop plate.

This solution has the considerable advantage that the stop bars are firmly connected to one of the two stop plates so that it is sufficient for the stop bars which are required in each case to be swung or pushed out of the grooves in said stop plate into the grooves of the second stop plate. In practice, the operator initially swings or pushes all stop bars out of the grooves in the one stop plate and then by visual inspection in the presence of the tool decides which stop bars are required and which are to be swung or pushed back.

As a further feature of the invention, the depth of the groove in the two stop plates is greater than the width of the stop bars, so that there is a space between them and the bottom of the groove. It is furthermore favorable for that end of each groove which faces away from the tool to have a groove bottom which extends essentially in the form of an arc with respect to the stop plane.

As a result of the distance between the stop bars and the bottom of the groove foreign substances which have penetrated into the groove, for instance wood chips or the like, are prevented from impeding or preventing the complete insertion of the stop bars into the groove. The stop bars thus do not protrude from either the grooves of the first stop plate or from the grooves of the second stop plate, so that a smooth guide plane not interrupted by projections is available on both of the stop plates.

The groove bottom which extends in an arc with respect to the stop plane facilitates the cleaning of the groove, for instance by blowing out saw dust which has penetrated therein and which cannot deposit itself in undercuts or similar dead spaces such as present in the case of the safety stop of Federal Republic of Germany Provisional Patent No. AS 1 031 954.

In order to facilitate the swinging of the stop bars out of the grooves of the first stop plate it is advantageous to provide means for the swinging of the stop bars out of the grooves. This device preferably consists of ejection cams which can be swung into each groove.

In order, upon the swinging of the stop bars back into the corresponding grooves, not to encounter the resistance which the ejection cams would offer if one forgot to swing them back into their initial position, it is advantageous for a return spring which swings the ejection cams back out of the grooves to act on a turntable rod which can be actuated from the outside and on which all the ejection cams are fastened.

In the previously known safety stops, the width of the opening of the slot for the passage of the tool is pre-established by the length of the stop bars. The slot can, therefore, not be reduced in size, which has the consequence that the stop plates cannot in all cases be brought so close to the tool that the tearing of the piece of wood is prevented.

This disadvantage is avoided by the invention in the manner that the stop plates are arranged displaceably with respect to each other so that the width of the opening of the slot can be adjusted as needed.

In order to assure dependable seating of the stop bars in the grooves of the stop plates, a longitudinal furrow into which a detent element engages upon the swinging or pushing of the stop bar into the associated groove is provided in the top or bottom of the stop bars. Since this detent element engages in a longitudinal furrow the detention seat of the stop bar is variable in this groove in the case of the second stop plate so that a relative displacement of the two stop plates is possible.

The detent element is preferably a spring-loaded ball which is seated in the groove. If, in the case of the second stop plate, the balls are arranged on the end of the grooves facing the tool, a dependable seat of the stop bar in question in the groove in the second stop plate can be assured even with the largest possible slot between the two stop plates.

Since the height of the stop bars can be kept small it is possible to cover practically all conditions of use with respect to the milling tools employed. Nevertheless, miller heights and miller positions are conceivable with which the stop bars available, despite their small height, would extend into the operating region of the millers. In order to remedy this, each stop plate has an insert of continuously variable height in which the grooves are formed. In this way the stop bars can be brought into intermediate heights should this be necessary.

The inserts are fastened in such a manner that, if necessary, they can be removed out of the stop plate from its front that is from the side of the operator. For example, each insert may be provided on its rear side facing the stop plate with a guide column which engages into a vertical guide recess of the stop plate. Further, a guide ledge may protrude from the guide column on both sides. The guide ledge is spaced from the rear wall of the insert and is adapted to engage behind two guide bolts located in the guide recess of the stop plate. A set screw may be provided on the corresponding stop plate for adjusting the height of the insert. The free end of the set screw may be provided with a head that engages into a corresponding seat protruding from the rear wall of the insert.

In order to assure a uniform adjustment in height of the two inserts, each insert is provided with a measurement scale from which the adjustment can be read and set.

In order to limit the downward displacement of the two inserts end stops are provided which prevent the lower edge of the inserts from being moved below the lower edge of the stop plate.

If only very thin workpieces for which a very low position of the miller is necessary are to be worked it is advantageous for the lowermost stop bar of the vertically standing stop plates to have on its top a recess which reduces its height and cover the greatest part of its length.

Since the lowermost stop bar is seated in an open-bottom groove of the corresponding stop plate, special detent means are necessary in order to hold this stop bar in its respective position. This may, for example, be achieved by providing a ribbed-shaped projection in the bottom of the lower most groove of each of the upright stop plates. Upon swinging the lower most stop bar into the lower most groove of the upright stop plates, the respective rib-shaped projection will engage into recess extending in longitudinal direction on the facing longitudinal side of the lower most stop bar. Further, the lower most stop bar may be provided on its top, in the vicinity of its free end, with a spring-loaded ball which, when said stop bar is in the position swung back into a groove of the first stop plate, snaps into a seat provided above the ball in the groove of the first stop plate, while, when it is in the position swung into the groove of the second stop plate, it snaps into a longitudinal furrow provided above the ball in the groove of the second stop plate.

For attachment to the specific woodworking machine, each stop plate is provided on its rear with a vertically and horizontally displaceable fastening member the position of which can be adapted to the different holding means of woodworking machines.

For this purpose a guide recess is preferably provided in the rear of the stop plate, into which recess there engages a horizontally displaceable circular disk which, upon its horizontal displacement, is freely rotatable around the axis of its circle and from which a threaded bolt or the like extends eccentrically. The threaded bolt serves to clamp in position the disk and thus clamp the entire stop plate to the holding means of the machine by means of a clamping knob or the like.

BRIEF DESCRIPTION OF THE DRAWINGS

The invention will be described below with reference to an embodiment shown in the drawing, in which:

As shown in FIG. 1, a first stop plate 10 and a second stop plate 12 are so attached, by fastening means described further below, to a machine tool on both sides of a tool 14, for instance a miller of a woodworking machine, that they lie in a common plane and leave between each other a slot 16 for the passage of the tool 14. On the two oppositely directed ends of the upright stop plates there ar provided vertically extending clamping grooves 18 into which known universal clips can engage, for example clips in accordance with German Utility Model No. 82 08 234, in order to fasten auxiliary attachments.

FIG. 1, and particularly FIGS. 4 and 6, show that in the stop plate 10—and also in the stop plate 12—there is provided a recess 20 which is open towards the front and towards the slot 16 and within which an insert 22 is so seated that its front side 24 is flush with the front side 26 of the stop plate. In this way the guide plane of the stop plate is not interrupted.

Figure 1:
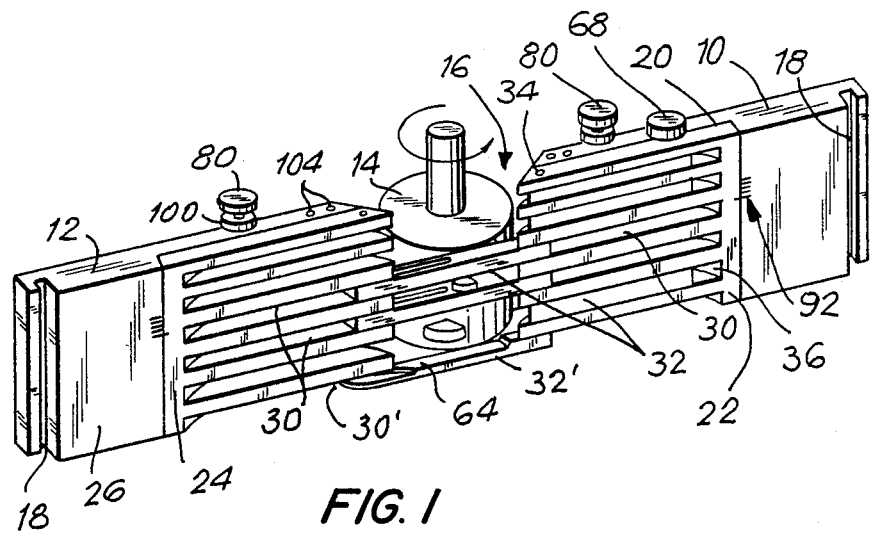
FIG. 1 is a perspective view of a safety stop according to the invention.
Figure 2:
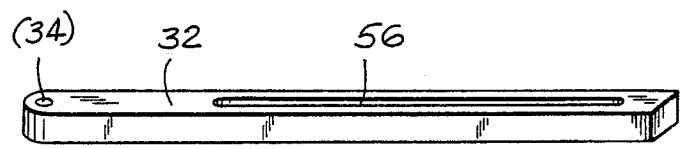
FIG. 2 is an enlarged view of a stop bar.

The two faces 28 of the two stop plates 10 and 12 which diverge towards the tool 14 are also not interrupted by the corresponding face of the insert 22, so that there is sufficient room for the tool 14 present in the slot 16 without having to pull the two stop plates 10 and 12 further apart than necessary for this purpose.

In each insert 22 there are provided horizontal grooves 30 arranged at uniform distances apart, one above the other, the grooves being open towards the front side 24 and towards the slot 16. The lowermost groove 30' is furthermore also open towards the bottom.

Each groove 30 of the insert 22 of the first stop plate 10 is adapted to receive a stop bar 32 the height of which corresponds to the height of the groove 30 and which terminates flush with the front side 24 of the insert 22, so that the guide plane of the stop plate is not interrupted. The stop bars 32 are pivotally mounted via a common pin 34 in the vicinity of the slot 16 so that, as shown particularly in FIG. 1, they can be swung individually out of the grooves 30 of the first stop plate 10 into the grooves 30 in the second stop plate 12 which lie opposite the grooves in the first stop plate at the same height. This way, the stop bars 32 which have been swung out span over the slot 16 through which the tool 14 for the working of the workpiece protrudes. As a rule, a number of stop bars 32 which is sufficient to cover the slot except for a passage opening for the tool 14 should always be swung 30 of the second stop plate 12.

Figure 4:
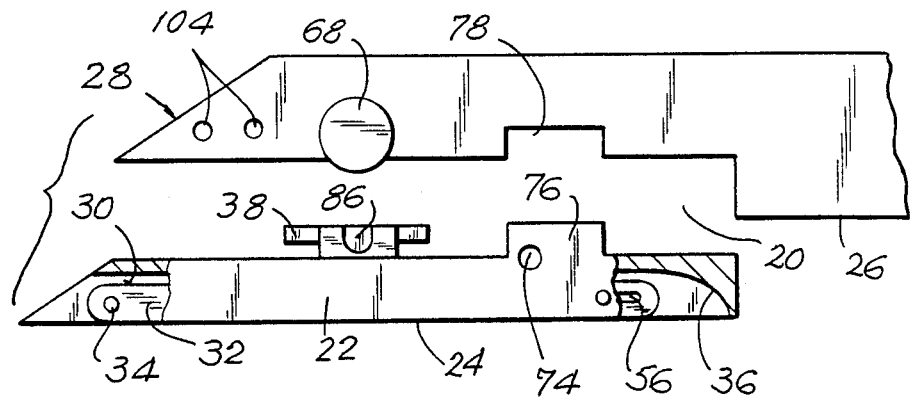
FIG. 4 is a top view of the first stop plate with the insert removed.

The depth of the grooves 30 in the inserts 22 of the stop plates 10 and 12 is somewhat greater than the width of the stop bars 32 so that the latter have a clearance from the vertical bottom of the groove into which particles of dirt such as sawdust or the like can move when the stop bars 32 are pressed into the corresponding groove 30 (see FIG. 4). This way, the complete insertion of the stop bars 32 into the grooves 30 is not prevented and a completely flat stop surface is always available. In order to prevent the stop bars from being pushed to the bottom of the grooves 30 and thereby overcoming said clearance, spacer members are provided on the bottom of the groove. The spacer members extend into the groove by an amount equal to said clearance, and may, for instance, be represented by parts of the turnable rod 66 described below.

Figure 8:
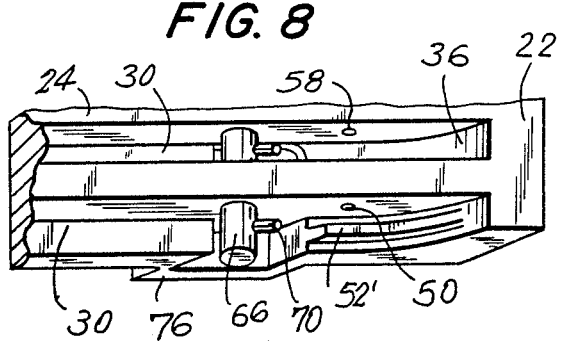
FIG. 8 is a perspective view of the end of the lowermost groove of the insert of the first stop plate.
Figure 9:
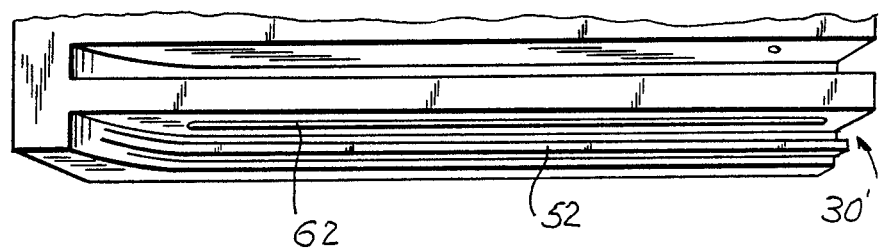
FIG. 9 is a perspective view of the two lowermost grooves of the insert of the second stop plate.

FIGS. 4, 8 and 9 show that that end of each groove 30 which faces away from the tool 14 has an arcuately extending groove bottom 36. This way, foreign substances such as dirt, wood chips, sawdust or the like can be easily removed from the groove 30, for instance by blowing, without being caught on sharp corners or edges.

Figure 3:
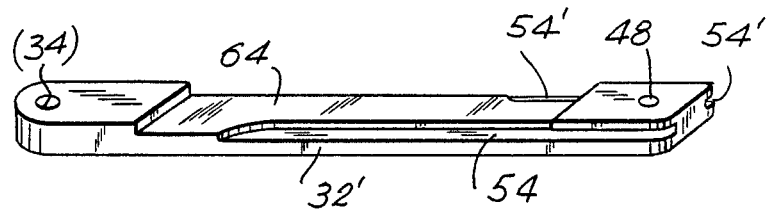
FIG. 3 an enlarged view of the lowermost stop bar.
Figure 7:
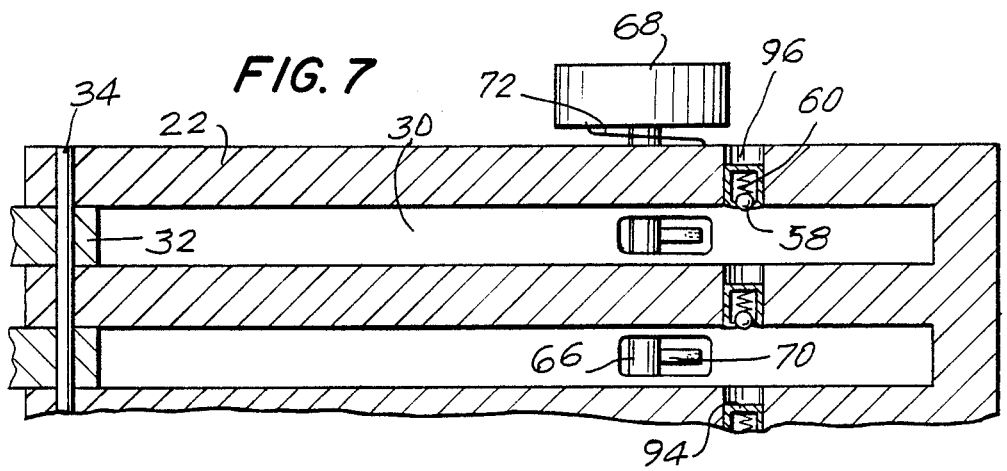
FIG. 7 is a front view, partially cut away, of the insert of the first stop plate.

In order to assure a dependable seat of the stop bars 32 in the grooves 30, each stop bar 32, except for the lowest stop bar 32' shown in FIG. 3, has a longitudinal furrow 56 on its top into which a detent element snaps when the stop bar 32 is swung into the associated groove 30 of the first or second stop plate. As shown in FIG. 7, the detent elements are balls 58 which are pressed by springs 60 into the longitudinal furrows 56. The balls 58 are arranged together with their springs 60 in sleeves 94 which are pressed into vertical passage holes 96 in the inserts 22.

In the case of the first stop plate 10 the balls 58 are located in th vicinity of the arcuately extending end of the grooves 30 while in the case of the second stop plate 12 they are arranged at the end of the grooves 30 facing the tool 14. In this way different widths of opening for the slot 16 can be selected, depending on the conditions of use, without endangering the detent seat of the specific stop bars 22 used in the second stop plate 12. In this way, a minimum width of opening for the slot 16 can be established so that tears of the wood during milling are prevented.

As shown in FIGS. 3 and 8, in order to secure the lowermost stop bar 32 in the groove 30' which is also open at its bottom, this stop bar has on its top in the vicinity of its free end a spring-loaded ball 48 which, in the position swung back into the lowermost groove 30' of the first stop plate 10, snaps into a seat 50 which is provided above the ball 48 in the groove 30'. For fixing the height a recess 54' is provided which extends in the longitudinal direction of the bar and is located in the region of the end of the bar. The recess extends over a rib-shaped projection 52' which protrudes horizontally from the bottom of the lowermost groove 30'.

If the lowermost stop bar 32' is swung into the opposite lowermost groove 30' of the second stop plate 12, a longer, also rib-shaped projection 52 serves for its fixing in height. As can be seen in FIG. 9, the projection 52 protrudes from the rear wall of the lowermost groove 30' in the longitudinal direction thereof and engages into a recess 54' which extends on the opposite longitudinal side of the lowermost stop bar 32' in the longitudinal direction thereof. In this way the width of the slot 16 can be changed without affecting the secured seat of also the lowermost stop bar 32'.

The lowermost stop bar 32' is secured in the lowermost groove 30' of the second stop plate 12 in the manner that the ball 48 which extends out of the top in the vicinity of the free end of the bar snaps into a longitudinal groove 62 (FIG. 9), which is provided above said ball in the lowermost groove 30' This longitudinal groove 62 also permits the displacement of the two stop plates 10 and 12 relative to each other without the lowermost stop bar losing its seat in the groove 30' of the second stop plate 12.

FIGS. 1 and 3 furthermore show that the lowermost stop bar 32' has on its top a recess 64 which covers the greatest portion of its length and reduces the height thereof by approximately one-half. As a result of this, it is possible to displace the tool 14 as far as possible downward so as to be able to machine also very flat workpieces.

In the insert 22 of the stop plate 10 there is mounted in the region remote from the slot, a vertical turnable rod 66 (FIG. 7) on the upward-protruding end of which a turning knob 68 for manual actuation is fastened. As shown in FIG. 8, the turnable rod 66 is provided at the height of each groove 30, with an ejection cam 70 in the form of a screw head. The cam engages into the groove 30 upon the turning of the turnable rod 66 and thereby swings the corresponding stop bar 32 around the common axis 34 out of the groove 30. In order that, after the stop bars 32 have been swung out from the grooves 30, the eccentric ejection cams 70 automatically come out again from the region of the groove so a not to prevent the pressing of the stop bars 32 back into the grooves 30, a return spring 72 acts on the turnable rod 66 and, after release of the turnable knob 68, turns the turnable rod 66 back into its initial position.

Figure 5:
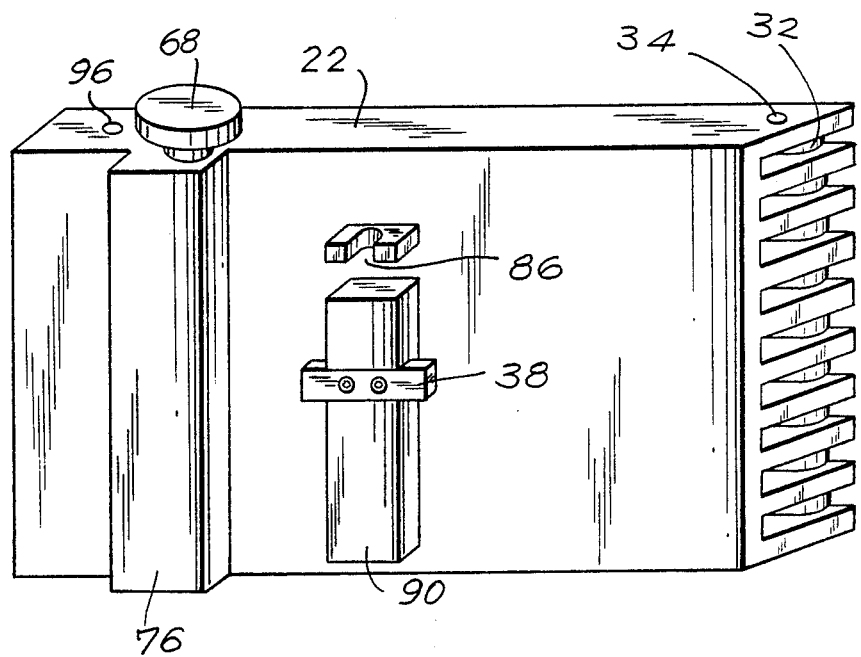
FIG. 5 is a rear view of the insert shown in FIG. 4.

As shown in FIGS. 4 and 5, a vertical borehole 74 serves as seat of the turnable rod 66 in the insert 22, said hole being formed in part in a guide block 76 which protrudes from the rear side of the insert 22 and engages into a corresponding guide groove 78 in the stop plate 10 or 12, respectively.

Figure 6:
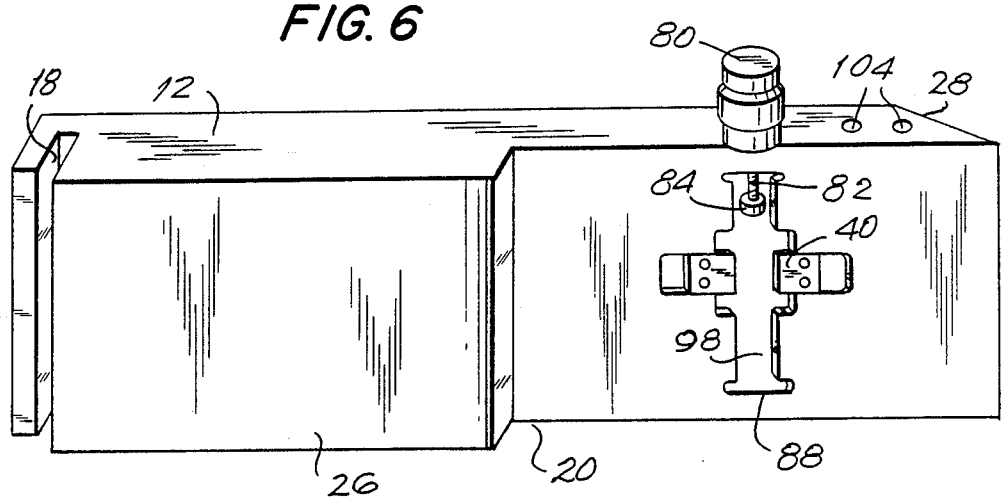
FIG. 6 is a front view of the second stop plate, without insert.

As shown in FIGS. 1 and 6, each insert 22 is continuously adjustable in height in the corresponding stop plate 10 or 12. For this purpose a set screw 80 is provided which extends out of the top of the stop plate and can be turned by means of its thread 82 in a threaded hole in the stop plate 10 o 12 respectively. On the lower end of the set screw 80 there is fastened a head 84 which engages into a seat 86 (FIGS. 4 and 5) which is formed on the rear of the insert 22 and is open towards the stop plate, it carrying the insert 22 along with it upon its vertical displacement.

The seat 86 is arranged above a guide column 90 which engages into a vertical guide recess 98 in the stop plate. On both sides of the guide column 90 horizontal guide ledge 38 protrudes from it, spaced from the rear wall of the insert 22, said ledge engaging behind two guide bolts 40 in the guide recess 98 of the stop plate (see FIGS. 4 to 6).

In order to prevent the stop plate 10 or 12 being pushed downward, upon the vertical displacement of the insert 22, out of the recess 20, the lower end of the guide recess 98 has an end stop 88 against which the lower end of the guide column 90 comes in its lowermost position.

As a result of the mounting of the insert 22 in the corresponding stop plate which has been described, the insert can, if necessary, be removed from the front, namely from the side of the operator. The set screw 80 is provided for the locking thereof with a lock nut 100 in order to prevent the corresponding insert 2 from shifting vertically.

Of course, other possibilities of construction besides the set screw 80 which has been described ar possible for the continuous adjustment in height of the insert 22.

In order to assure a uniform adjustment in height of the two inserts 22 in the first stop plate 10 and in the second stop plate 12, each insert 22 has a measurement scale 92 associated with it.

Figure 10:
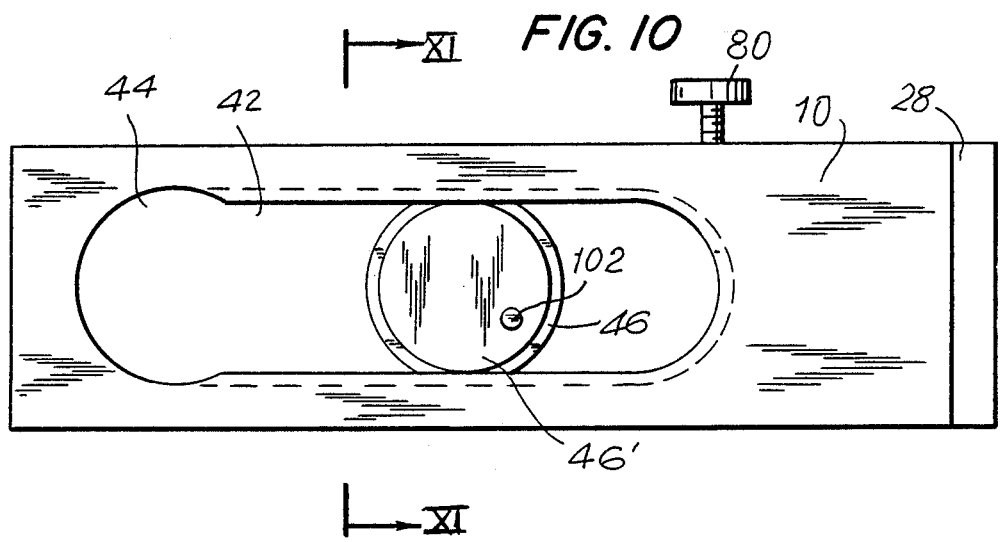
FIG. 10 is a rear view of the first stop plate.
Figure 11:
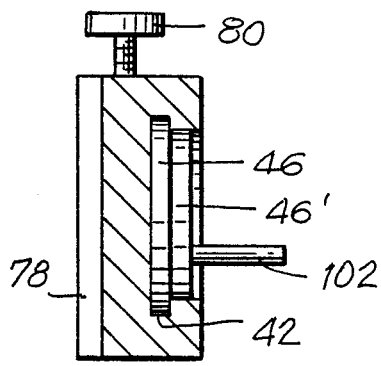
FIG. 11 is a cross section through the first stop plate shown in the plane XI—XI of FIG. 10.

FIGS. 10 and 11 show a universal possibility for the attachment of the stop plate 10 or 12 to the woodworking machine. In this case a guide recess 42 is provided in the rear of the stop plate 10—the same is true of the opposite stop plate 12—said recess extending in the longitudinal direction of the stop plate 10 and having circularly rounded ends. As FIG. 11 shows, the upper and lower edges of the guide recess 42 are developed as an undercut which terminates at the left-hand end—as seen in FIG. 10—of the guide recess 42. In this way the guide recess 42 is widened here into a circular entrance opening 44. A circular disk 46 from which there protrudes coaxially a circular disk 46' of a smaller diameter which corresponds to the inside dimension of the guide recess 42, can be introduced into said entrance opening 44. If the disk 46, 46' is moved from the entrance opening 44 towards the opposite end of the guide recess 42, whereby it is rotated freely around the axis of its circle, it can be moved into any desired position within the guide recess 42 without falling out of it. From the smaller disk 46' there eccentrically protrudes a threaded bolt 102 the vertical position of which can be varied by turning the disk 46.

With this type of attachment, any desired vertical position and horizontal position can be selected so as to be able to adapt the attachment of the stop plate to the machine tool or to the means present there. For the fixing in place there is used a threaded nut (not shown) with a clamping knob or the like which is screwed onto the threaded bolt 102 and produces a dependable clamp attachment of the stop plate to the fastening means of the machine tool.

Two vertical boreholes 104 are provided in the stop plates 10 and 12 respectively in the vicinity of the slot 16 for the passage of the tool 14, said holes serving for the suspension of a required protective covering for the tool 14.

Instead of the stop bars 32 being turnably mounted in the first stop plate 10 it is also possible to guide them for displacement in their longitudinal direction in the grooves 30.

A very rigid plastic, for instance GFK, in addition to metal may be used as material for the stop plates, inserts and stop bars.

While there have been shown and described and pointed out fundamental novel features of the invention as applied to a preferred embodiment thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A safety stop for woodworking machines, particularly milling machines, comprising:
    (a) a first and second stop plate having a plurality of horizontally extending grooves therein; the stop plates being arranged in a common plane and spaced apart from each other so as to provide a slot for the passage of a tool; and
    (b) a plurality of parallel stop bars mounted in nonlosable manner within the grooves of the first stop plate for introduction from the grooves of the first stop plates into the grooves of the second stop plate so as to span over the slot formed between the stop plates.

2. The safety stop according to claim 1, wherein the depth of the grooves of the two stop plates is greater than the width of the stop bars so that a space is present between the bars and the bottom of the groove.

3. The safety stop according to claim 1, wherein the end of each groove facing away from the tool has a groove bottom which extends substantially in the form of an arc to the stop plane.

4. The safety stop according to claim 1, further comprising means operatively connected to the first stop plate for swinging the stop bars out of the grooves of the first stop plate into the grooves of the second stop plate.

5. The safety stop according to claim 4, wherein the swinging means comprises ejection cams which cam be swung into each groove.

6. The safety stop according to claim 5, wherein the ejection cams of the stop plate are fastened on a turnable rod which can be actuated from the outside.

7. The safety stop according to claim 6, further comprising a return spring acting on the turnable rod for swinging the ejection cam back out of the grooves.

8. The safety stop according to claim 1, wherein stop plates are adjustable with respect to each other so as to adjust the size of the opening of the slot.

9. The safety stop according to claim 1, further comprising a longitudinal furrow in the top or bottom of the stop bars, and detent means for engaging into the furrow upon the insertion of the stop bar into the associated groove.

10. The safety stop according to claim 9, wherein the detent means is a spring-loaded ball located in the groove.

11. The safety stop according to claim 10, wherein the ball is arranged, in the case of the second stop plate, at the end of the grooves which face the tool.

12. The safety stop according to claim 1, wherein the lowermost stop bar of the stop plates is provided on its top with a recess which covers substantially the entire region of the length of the bar.

13. The safety stop according to claim 1, wherein the lowermost groove of each of the stop plates is provided in the bottom of the groove with a rib-shaped projection which engages into a recess extending in longitudinal direction on the facing longitudinal side of the lowermost stop bar when the stop bar is swinging into the lowermost groove.

14. The safety stop according to claim 13, wherein the lowermost stop bar is provided on its top, in the vicinity of its free end, with a spring-loaded ball which, when said stop bar is in the position swung back into a groove of the first stop plate, snaps into a seat provided above the ball in the lowermost groove, and which stop ball when the stop bar is in the position swung into the lowermost groove of the second stop plate, snaps into a longitudinal furrow provided above the ball in the lowermost groove of the second stop plate.

15. The safety stop according to claim 1, further comprising a vertically and horizontally displaceable fastening member provided on the rear side of each stop plate for attachment of the stop plate to the woodworking machine.

16. The safety stop according to claim 15, comprising stop plates having a guide recess in the rear thereof; a horizontal, displaceable circular disk operatively connected to the guide recess so that upon horizontal displacement, the disk is freely turnable around the axis of its circle; and a threaded bolt protruding eccentrically from the disk.

17. A safety stop for woodworking machines particularly milling machines, comprising:
(a) a first and second stop plate having a plurality of horizontally extending grooves therein; the stop plates being arranged in a common plane and spaced apart from each other so as to provide a slot for the passage of a tool;
(b) an insert connected to each stop plate for housing the grooves, the insert being continuously adjustable in height; and
(c) a plurality of stop bars mounted in non-losable manner within the grooves of the first stop plate for introduction from the grooves of the first stop plates into the grooves of the second stop plates so as to span over the slot formed between the stop plates.

18. The safety stop according to claim 17, wherein each insert is provided on its rear side facing the stop plate with a guide column which engages into a vertical guide recess of the stop plate.

19. The safety stop according to claim 18, further comprising a guide ledge protruding from the guide column on both sides, spaced from the rear wall of the insert; and two guide bolts for engaging the guide ledge in the guide recess of the stop plate.

20. The safety stop according to claim 19, further comprising a set screw on the stop plane for adjusting the height of the insert.

21. The safety stop according to claim 20, wherein the free end of the set screw is provided with a head which engages into a seat in the insert, said seat being open towards the stop plate.

22. The safety stop according to claim 21, further comprising end stops at the guide recess for limiting the downward displacement of the insert.

23. The safety stop according to claim 22, further comprising a measurement scale associated with each insert.

* * * * *